United States Patent [19]
Hohl

[11] Patent Number: 5,646,157
[45] Date of Patent: Jul. 8, 1997

[54] DISPOSAL OF OBSOLETE TREATED SEED

[75] Inventor: Kaspar J. Hohl, Therwil, Switzerland

[73] Assignee: Novartis Corporation, Tarrytown, N.Y.

[21] Appl. No.: 473,820

[22] Filed: Jun. 7, 1995

Related U.S. Application Data

[63] Continuation-in-part of Ser. No. 207,781, Mar. 8, 1994, abandoned, which is a continuation-in-part of Ser. No. 977,317, Nov. 17, 1992, abandoned.

[30] Foreign Application Priority Data

Dec. 5, 1991 [DE] Germany ............ 91810946.3

[51] Int. Cl.$^6$ ............ A01N 43/48; A01N 43/54; C05F 11/00
[52] U.S. Cl. ............ 514/272; 514/421; 514/476; 71/6; 71/23; 71/25; 71/27; 71/901
[58] Field of Search ............ 71/6, 23, 25, 27, 71/901; 514/272, 421, 476

[56] References Cited

U.S. PATENT DOCUMENTS 5,322,629  6/1994  Stewart .................. 210/767

FOREIGN PATENT DOCUMENTS 0445102  1/1991  Germany.
WO9203393  8/1990  WIPO.

OTHER PUBLICATIONS

Buyanovsky et al., "Degradation of Captan Under Laboratory Conditions", *Bull. Environ. Cont. Toxicol.*, 40:689–695 (1988).

Coats et al., "Detoxification of Captan–Treated Seed Corn", *Abstract of Papers of the American Chemical Society*, 82 (1979).

Kibler, 1973 PhD Thesis; Abstract of "Field and Laboratory Trials on the Degradation Kinetics of Chlortoluron and Simazine in Soils in the Presences of Other Pesticides", *University of Hohenheim*, (1979).

Schoen et al., Abstract of Papers, "The Effects of Various Soil Factors and Amendments on the Degradation of Pesticides Mixtures", *189th ACS National Meeting*, (1985).

The Agrochemicals Handbook, 3rd edition, The Royal Society of Chemistry, Cambridge, England, 1991, p. A0031.

*Primary Examiner*—Allen J. Robinson
*Assistant Examiner*—Brian G. Bembenick
*Attorney, Agent, or Firm*—Gary M. Pace

[57] ABSTRACT

The present invention relates to a process of disposing obsolete planting seed treated with seed-protectant coatings, especially coatings comprising captan or any of the other widely used compounds such as, for example, pirimiphos-methyl and thiram, alone or in combination with other fungicidally or even insecticidally active compounds, which process comprises subjecting the said plant seed to a compostation.

20 Claims, No Drawings

DISPOSAL OF OBSOLETE TREATED SEED

This application is a Continuation-In-Part Application of U.S. application Ser. No. 08/207,781 filed Mar. 8, 1994 (ABN), which is a Continuation-In-Part Application of U.S. application Ser. No. 07/977,317 filed Nov. 17, 1992 (abandoned), which disclosures are herein incorporated by reference.

BACKGROUND OF THE INVENTION

The present invention relates to a method of disposing obsolete planting seed treated with seed-protectant coatings, especially coatings comprising captan or any of the other widely used compounds such as, for example, pirimiphos-methyl [Actellic®] and thiram [TMTD®], alone or in combination with other fungicidally or even insecticidally active compounds. In France alone, the seed corn industry will generate 10,000 metric tons of obsolete treated seed corn 1990, equal to 10% of the total French seed corn market volume.

The planting seed industry has at present few options available for the disposal of obsolete treated planting seed that are acceptable by today's standards. An acceptable option would be one which is sound ecologically, safe, final and economical.

Nevertheless, each seed company has, or—at least until recently had—its own method of disposing of obsolete treated seed. These include various "detreatments", such as washing (which causes rinsate problems) [Coats and Dahm, 1979] or detreating by heat (which often proved to be of questionable effectiveness). In some countries, the seed treatment is washed off and the seed is fermented to produce bio-alcohol. Again, the question arises as to the fate of the rinsate. More recently, incineration joined the list of options. However, the demand for incinerator capacity is enormous and driving up the disposal cost.

Where rainfall patterns and cropping practices permit, obsolete treated seed corn is put to good use to produce green manure. This is currently being done in Switzerland. Of the above methods, green manure would appear to be the only one that can be considered acceptable. Nevertheless, its use is not possible where rainfall amounts are limited and where farmers do not traditionally use green manure in the crop rotation. In the South of France, Italy and Spain, where most of Europe's seed corn is produced, green manure could only be produced under irrigation, which is not economical.

It must be concluded that currently there is no universally practicable option to dispose, in an acceptable manner, of obsolete treated seed available to the seed industry. There is, therefore, a clear-cut need for an acceptable solution to this problem.

SUMMARY OF THE INVENTION

Now, within the scope of the instant invention it was surprisingly found, that this problem can be solved by applying very simple technical means. In particular, the present invention provides a method of decomposing obsolete plant seed treated with seed-protectant coatings, which method comprises treating the said planting seed in a compostation process. Compostation is a process in which organic material, customarily concentrated in a heap, is degraded by aerobic microorganisms and small fauna. The final product is stable, rich in plant nutrients and has good water holding capacity. Compostation differs from the natural process of degradation of organic material which occurs, for example, on the surface of sobs, in that man intervenes to provide an environment of high moisture and controlled aeration which is beneficial to the proliferation of microflora and thereby to the speed of the process.

Compostation is attractive because of the relatively low cost of the initial investment, compared to say a high-temperature incinerator. The final product, compost, is a valuable fertilizer, is beneficial to soil structure and is applied in horticulture, agriculture or in landscaping. However, up to now compostation has not been considered an option for disposing obsolete treated planting seed.

A number of active ingredients are used to treat planting seed. Apart from fungicidal and/or insecticidal active ingredients seed treatment products typically contain (a) dyes and colorants, which are added to signify that the seed has been treated with potentially hazardous chemicals in order to prevent accidental poisoning by ingestion of livestock or humans;

(b) binders and other additives, which are added to improve the adhesion of the seed treatment to the seed and to improve seeds' flowability to ensure optimum planter performance;

(c) repellents, which are added to address the risk of animal attacking planted seeds, or young seedlings;

(d) plant nutrients, which are added in order to provide optimal conditions to get the crop established;

(e) safeners, which are used to prevent herbicide damage on susceptible crops;

(f) and, optionally, inert matter, which is added to seeds in order to enhance the regularity of their shape and thereby improve the planter precision.

Amongst the active ingredients used in seed treatment, captan is one of the most widely used. Captan, the IUPAC name of which is 1,2,3,6-tetrahydro-N-(trichloromethylthio) phthalimide, belongs to the phthalimide group of fungicides. Captan is effective against a broad spectrum of fungi and is non-specific. It is thus predominantly used to control fungal diseases of many fruit, vegetable and ornamental crops.

Further compounds commonly used in seed treatment are, for example, thiram, a fungicide, the IUPAC name of which is tetramethylthiuram disulphide and pirimiphos-methyl [O-2-diethylamino-6-methylpyrimidin-4-yl O,O-dimethyl phosphorothioate], which is a fast-acting insecticide and acaricide.

Captan used as a seed treatment for seed corn is usually applied at a rate of 150 g active ingredient (a.i.) per 100 kg seed. Actual dosages applied to seed can vary significantly from the target dosage because the applied amount is determined subjectively, usually based on visual impression. At this application rate, one would expect an initial captan content of 1,500 mg per kg seed, or about 500 mg/kg compost to which 3 parts of other organic material such as, for example, tree bark had been added.

The degradation of captan has been studied under field and laboratory conditions. Buyanovsky et al (1988) report that captan is not an energy source for the general microbial population present in soils. Accordingly, the captan-degrading capacity of the soil-borne organisms proved to be relatively low. After a 2 month incubation 57–64% of applied captan was still extractable as unchanged starting material. The reason therefore may at least partially be seen in its toxic properties, which may negatively influence degrading soil-borne microorganisms, especially microorganisms belonging to the fungi.

Similar observations are reported by Schoen and Winterlin (1985), which investigated the effect of pH, moisture content, soil type and organic amendments on the degradation rate of mixtures containing atrazine, captan, carbaryl, 2,4-D, diazinon, fenitrothion, and trifluralin. Using a simple laboratory model they could demonstrate that abiotic degradation, rather than microbial metabolism, was often the primary route of loss. They further report that the degradation rates are much slower at high (1000 ppm) than moderate (100 ppm) pesticide concentrations. Moreover, captan seems to interfere with the degradation of accompanying pesticides. Kibler (1973) report that in the laboratory the degradation of simazine in the soil was delayed by increasing doses of captan.

From what was known in the art but especially from the above results it was not to be expected that using a compostation process would be an option for decomposing obsolete plant seed treated with seed-protectant coatings, especially coatings comprising captan or any of the other widely used compounds such as, for example, pirimiphos-methyl and thiram, alone or in combination with other fungicidally or even insecticidally active compounds and further ingredients customarily used in plant seed treatment like those mentioned hereinbefore (dyes, colorants, binders, repellents, etc.). This is why the use of plant seed treated with any of the commonly used seed-protectant coatings to make compost has not been reported hitherto. Within the scope of the present invention it was surprisingly found that obsolete plant seed treated with seed-protectant coatings can be very efficiently disposed by treating the said seed in a compostation process. In case of captan treated seed a 4,200 to at least 2,500 fold decrease could be observed during the compostation process. Comparable results are to be observed using plant seed treated with pirimiphos-methyl or thiram.

DETAILED DESCRIPTION OF THE INVENTION

The present invention thus primarily relates to a process of disposing obsolete plant seed treated with seed-protectant coatings, especially coatings comprising captan or any of the other widely used compounds such as, for example, pirimiphos-methyl and thiram, alone or in combination with other fungicidally or insecticidally active compounds as well as further ingredients customarily used in planting seed treatment, which process comprises subjecting the said seed to a compostation process.

In particular the decomposition process according to the invention comprises the following steps:

(a) intermixing the obsolete treated plant seed together with an additional source of energy, that can be suitably used by the microorganisms involved in the compostation process and that guarantee a balanced C/N ratio of the raw materials, using one of the customarily used compostation equipment;

(b) optionally adding a neutral, inorganic, water-insoluble carrier comprising a large surface area in relation to its diameter to support the development and spread of the microorganisms in the organic material and/or any other supplemental material that is capable of positively influencing microbial decomposing activity;

(c) ensuring a sufficient aeration and moisture content; and (d) initiating the compostation process by adding a suitable amount of water.

The process according to the invention may be carried out using a dynamic or a static type of technique customarily used in compostation. The traditional form of composting is performed in heaps, which represents the static type. The heaps should be no higher than about 1.5 m in the absence of artificial aeration. The heaps should be further designed such that the drainage of rainwater out of the heaps is prevented, since captan and possibly other seed treatment compounds present are water soluble and are therefore subject to leaching losses, especially in the initial phases of the process. Prevention of leaching losses can be accomplished, for example, by conducting the compostation process on water impermeable pads, made of materials such as concrete. In addition, precautions should be taken to prevent too much water reaching the heap.

Compostation is an aerobic process, which means that the microbes involved in the said process need a constant supply of oxygen. Attention must therefore be paid to a sufficient aeration of the heaps, which can be done in a number of possible ways. As already mentioned above, the simplest measure one can take is to restrict the size of the heap so that formation of anaerobic pockets is avoided, and to frequently remix its ingredients. In addition, artificial aeration devices may be used including, for example, pipes that become vertically inserted into the heap to mobilize the air using the natural chimney effect. Better aeration can also be achieved by laying perforated drainage pipes at the base of the heap, through which air can be sucked out of the heaps, thus providing uniform aeration. Also the addition of bulkier materials such as, for example, small branches or twigs may be helpful in assuring a sufficient exchange of $CO_2$ and $O_2$.

In order to be able to control moisture and aeration optimally, a water tight container in which the inflow of water can be carefully controlled and which is equipped with devices which allow periodically intermixing its contents, is preferred within the scope of the invention.

Especially preferred within the scope of the invention is a drum composter, which allows to exclude any interference with external influences and which can be revolved periodically in order to repeatedly remix its contents. Remixing the contents of the drum by turning it provides the oxygen needed for maintaining the high metabolic activity of the aerobic microorganisms involved in the compostation process.

For a large-scale application, the whole compostation equipment should be designed such that adequate access to the composting area with agricultural implements would be guaranteed, to assure efficient filling, emptying and frequent and thorough mixing of the material in all phases of the process. To help avoiding any excess of moisture and thus the forming of anaerobic pockets, the heap may be advantageously covered by water-proof tarpaulins. Composition and surface structure of the material to be decomposed are supposed to be decisive for the efficiency of the compostation process. Thus, to accelerate the rotting process it would be preferable to ensure that the compost fibre is in a suitable physical form. Too small a particle size might lead to the formation of a sludge and in the following to anaerobic conditions. It would be thus recommendable to comminute or disintegrate the organic material to be decomposed prior to subjecting it to the compostation process. However, to save energy expenditures the comminution should only be carried out as far as is necessary for the rotting process. It has proved advantageous to chose a particle size in the range from about 2 mm to about 40 mm, dependent on the organic material used. This guarantees that the surface area of the material is sufficiently enlarged for optimal microbial action without negatively influencing the capillary structure of the compost which is a prerequisite for an adequate aeration and moisture content.

Disintegration of the material to be decomposed can be achieved by use of suitable devices such as, for example, choppers equipped with a rotating knife and a fixed counter cutter or percussion mills, the working tools of which are blunt hammers which break the compost fibre against counter knives. Also useful in this respect are ripping machines that have both cutters and counter cutters rigidly fixed, usually in comb-like arrays.

Besides seed treated with seed protectant coatings, containers consisting of organic material such as, for example, paper, cardboard, sisal, ere which were used as packaging or wrapping material for the treated seed and which may thus be contaminated with seed treatment products can also be disposed of by compostation. The seeds as well as the containers to be decomposed within the process according to the invention can thus be introduced into the compostation process with or without any additional intervention. Dependent on their size, the seeds may, for example, be reduced to small pieces by grinding or shredding or equivalent measures. The same also applies to the containers to be composed of, which may either be left whole, or preferably, be reduced to small pieces prior to their introduction in the compostation process. Alternatively, the whole kernels or containers or both may likewise be used without any additional intervention.

The containers may be decomposed within the process according to the invention instead of, or preferably, as a supplement to seed treated with seed protectant coatings. The ratio of container material to treated seed may vary dependent on the material of the container and the degree of contamination. A suitable ratio can easily be found by a person of ordinary skill in the art using routine experimentation.

To speed up the development of the microflora and -fauna and thus the compostation process as a whole, it is recommendable to add an additional energy source. Preferred is an energy source that can be suitably utilized by the microorganisms involved in the compostation process such as, for example, tree bark, corn cobs, grass clippings, leaves, or any other vegetable waste. Especially preferred within the scope of the invention as a carbon source is an organic material that decays slowly, for example a material that has a high degree of lignification such as tree bark. Before being introduced into the compostation process, the said organic material is preferably comminuted or disintegrated as described above.

One of the major factors influencing an orderly course of the compostation process is the C:N ratio, which is the relation between the nitrogen and carbon contents of the raw materials. The C:N ratio determines the decomposition rate, since the microorganisms involved in the decomposition process can only oxidize excess carbon if there is sufficient ammonia available. Thus, independent of the organic material used as an additional energy source, precautions must be taken to ensure that a C:N ratio is arrived at that is optimal for the development and activity of the microorganisms involved in the compostation process. This objection can be advantageously achieved by adding a suitable N-source such as, for example, an ammonium fertilizer, that can be easily metabolized by the microorganisms involved in the compostation process. Especially preferred in this regard is using urea as an additional N-source. Preferred within the scope of the invention is a C:N ration that is in a range of from 30:1 to 45:1, preferably of from 35:1 to 45:1, and most preferably of 40:1.

Sometimes it may prove advantageous to add ripe compost or an equivalent starting material containing suitable microorganisms as an inoculant such as aerobes that can utilize cellulose, aerobes that can decompose organics at particularly high temperatures (thermophilic bacteria) and/ or aerobes that can decompose particularly persistent components of the raw compost such as lignin containing materials, either at the beginning or preferably during the compostation process.

A variety of commercial products is now available for supporting an orderly course of the rotting process. Products containing specialized decomposing organisms such as, for example, thermophilic cellulose-decomposing organisms have proved particularly effective.

Further additions that may be supplementary introduced into the compostation process comprise, for example, fertilizers such as urea, agents for adjusting the nutrient or mineral content such as raw ammonium salts and nitrates or raw phosphate and superphosphate that can be easily metabolized by the composting microorganisms, or agents for adjusting the pH of the raw material such as agricultural grade limestone, finely ground stone meals, carbonate chalk, fertilizer grade ammonium sulphate, etc.

Further nutrient materials that may be advantageously applied to the compostation process according to the invention are those disclosed in WO 92/03393.

It has also proved preferable to add as a further supplement a neutral, water-insoluble carrier material comprising a large surface area in relation to its diameter to support the development and spread of the microorganisms in the organic material such as charcoal, sand, larval rock, etc. Preferred within the scope of this invention are materials that are composed of hydrous silicates such as zeolithes. Zeolithes are part of the bedrock and are thus supposed to add some valuable properties to the soil when ripe compost is applied.

In addition, precautions must be taken to ensure that throughout the process a constant moisture is maintained. This can be achieved, for example, by repeatedly adding water during the compostation process according to a specific schedule that has to be made up empirically, since the frequency of the water supply is highly dependent on the conditions under which the compostation process is run. Preferred is a moisture content in a range of from about 20% to 80%, preferably from about 30% to 70%, and especially preferred from about 50% to 60%.

The optimal value for the pH lies in the neutral region, although most of the decomposing organisms involved in the compostation process can tolerate a slightly acidic environment, down to about pH 5.8.

At the initial phase of the compostation process, when a high-temperature fermentation takes place, it is to be recommended to mm over the raw compost several times. This can be done by hand or by means of mixing machines or any other device customarily used for this purpose, dependent on the preparation equipment available.

To ensure that the compostation runs without complications it would be necessary to constantly monitor the process. In a preferred embodiment of the present invention, an pronounced increase in temperature, preferably an increase of from about 27° C. up to about 70° C. within the initial decomposition phase can be observed. This increase in temperature is indicative of the fact that microbial activity has set in rapidly. During the rotting phase the pH is typically displaced towards the neutral or slightly alkaline region, because of the formation of ammonia.

Already within the first week, a thick layer of mycelia can often be observed on the surface of the material. If a drum composter is used, this layer reestablishes itself after each revolution of the drum for the first 14 days after initiation. It may happen that after about two to three weeks the biological process starts to shift from oxidation to an alcoholic fermentation, which is characterized by the typical yeasty odor, a plunge and stabilization of the pH at a very low value of about pH 5.8 to 3.2, and a significant reduction in temperature from about 57° C. to about 33° C. This does not negatively influence the process according to the invention, if the appropriate measures are taken to bring back the process to oxidation. This can be achieved, for example, by artificially raising the pH, preferably to values of about pH 6.2 to about 8.0 and most preferable of about pH 7.0 to about 7.6. Materials that can be suitably used to increase the pH value are, for example, those selected from the group consisting of agricultural grade limestone, finely ground stone meals, and carbonate chalk. A further measure that has proven helpful in this situation is the addition of ripe compost or any equivalent starting material as inoculant to restart the compostation process. If necessary, these measures may be repeated at a later stage during the compostation process.

The alcoholic fermentation may be prevented by choosing suitable organic materials. So may, for example, a component mixture comprising corn seeds and tree bark be expanded to include plant materials of several sources, such as, cobs, grass clippings, leaves, paper seed bags, etc.

It has also proven advantageous in this regard to add ripe compost and optionally a suitable N-source, that can be readily metabolized by the microorganisms involved in the compostation process such as, for example, a suitable ammonium fertilizer, already at the beginning of the compostation process. Especially preferred within the scope of the invention is using urea as an additional N-source.

The second phase of the compostation process, starting with about the 5th week and which goes through to the end, is characterized by an decrease in temperature in the core of the compost, due to the fact that the metabolic rate of the process has decreased. In the course of the compostation process, the volume of the material decreases by about 30% and significant amounts of water vapor and other gases, mainly $CO_2$, were given off. The color of the material darkens gradually throughout the process. The seed particles and the added organic material, which are easily distinguishable at the outset of the process, become more difficult to distinguish as the process progressed. In the end, the material has a homogenous deep brown color normally associated with well degraded organic matter.

There are no objective standards for evaluating utility and quality of the various stages of composting, so that agreement has been reached on arbitrary definitions. Ripe compost is customarily considered to contain no further sulphides or ammonia, since the rotting process is supposed to be virtually completed. References concerning compost testing are provided in Spohn (1975).

The content of the pesticidally active compounds used as seed-protectant coatings are continuously monitored by taking fresh weight samples of the material according to a preset sampling schedule. If not worked up at once, the samples are stored at low temperatures, preferably at −20° C. to prevent further biological activity. Observations on the compostation process are made and recorded.

The determination of the content of the pesticidally active compounds in the samples can be performed by chromatographic methods such as gas or liquid chromatography, or by UV spectrometry.

A method for detecting captan, one of the preferred objects of the present invention, is described by Buettler and Hoermann (1991). Five to fifty grams of homogenized material is extracted with acetone, and purified. Captan is determined by HPLC using UV detection.

Residue analysins of pirimiphos-methyl may be performed by HPLC and gas chromatography using a phosphor-nitrogen detector. Detection of thiram [TMTD®] may be achieved using UV spectrometrieat 435 nm.

The residue analysis shows a rapid decrease in the content of the compounds used as seed-protectant coatings over time. For example, the captan content decreases 4,200 to at least 2,500 fold, during the compostation process. Already after about 9 weeks till initiation of the compostation process the captan content reaches the detection level limit of 0.02 mg/kg. Comparable results can be obtained using any of the other widely used compounds such as, for example, pirimiphos-methyl and thiram.

Since the captan content was determined by residue analysis to have decreased at least 2,500 fold, it can reasonably be assumed that the captan content would also be decreased if its initial content is 10 times higher.

Thus, it has been demonstrated within the scope of the present invention, that compostation is a safe, economical and environmentally sound method of disposing of obsolete seed treated with seed-protectant coatings, especially coatings comprising captan or any of the other widely used compounds such as, for example, pirimiphos-methyl and thiram, alone or in combination with other fungicidally or even insecticidally active compounds. The process according to the invention as outlined hereinbefore may also be applicable to seed treated with other seed treatment compounds, such as, for example, carboxin, methalaxyl (Apron®) and others that are commonly used in seed treatment.

EXAMPLES

The following examples are offered by way of illustration and not by way of limitation.

EXAMPLE 1

Compostation of Captan Treated Seed Corn

1. Ingredients 1. 90 liters captan treated maize kernels, ground to 2 mm diameter. The captan was applied at a rate of 150 g a.i. per 100 kg seed corn;

2. 270 liters ground tree bark, ground to 2 mm diameter;

3. 3 liters VULKAMIN. (This is a brand name of a naturally occurring source of zeolites. Zeolites are composed of hydrous silicates and are used primarily because of their very large surface area in relation to their diameter. They are deadly colonized by bacteria and aid the spread of bacteria and fungi in the organic material to be composted. Its use assists the process.)

4. 90 liters of water were added in total throughout the process. 34 liters of water were added on Day 1 to initiate the process. On day 4, 10 liters of water were added. Another 10 liters were added on day 5.36 liters were added 13 days into the process.

2. Compostation process

The obsolete treated seed corn and the tree bark are placed in a drum composter with a content of 500 liters and subjected to the compostation process, which occurred autogenously. The ratio of corn to tree bark of 1:3 is arrived at to ensure the C:N ratio of 40:1, which proved to be ideal at the outset of compostation. The tree bark serves as an additional source of energy for the microorganisms.

The compost process is initiated by introducing the ground corn and the tree bark and the initial water dose. The compostation process is terminated after 122 days.

The drum composter is chosen to receive results that are as free as possible of external influences. The drum is regularly revolved in order to remix its contents. In particular, the drum in turned a total of 49 days out of the 112 days total. The remixing occurred 22 days out of the first 30 days and 27 times during the remaining 82 days.

The pH is measured and the temperature of the contents is taken both on the periphery and in the center of the drum daily for the first 4 weeks, and later every 2 to 4 days and weekly in the final stages.

Microbial activity set in rapidly as evidenced by the increase in temperature from 27° C. to 54° C. within 4 days. The red dye, added to the seed to indicate that it is treated, disappears within the first ten days. After 8 days, a thick layer of mycelia can be observed on the surface of the material. This layer reestablishes itself after each revolution of the drum for the first 14 days after initiation. In the third week after initiation, the biological process appears to be dominated by an alcoholic fermentation, characterized by the typical yeasty odor, a plunge and stabilization of the pH at a very low value of 4, and a significant reduction in temperature in the drum from 57° C. to 33° C. Five kg agricultural limestone is added to raise the pH, and 5 liters of ripe compost are added as inoculant to restart the compostation process. These measures are repeated on day 33.

In the course of the process, the volume of the material decreases by about 30% and significant amounts of water vapor and other gases, mainly $CO_2$, were given off. The color of the material darkens gradually throughout the process. The particles of maize kernels and the bark, easily distinguishable at the outset of the process, become more difficult to distinguish as the process progressed. In the end, the material has a homogenous deep brown color normally associated with well degraded organic matter.

In order to prevent the alcoholic fermentation the two component mixture (corn/tree bark) can be expanded to include plant materials of several sources, such as, cobs, grass clippings, leaves, paper seed bags, etc.

Residue Analysis

One kg flesh weight samples of the material are taken according to a preset sampling schedule. The samples are stored at −20° C. to prevent further biological activity. Observations on the compostation process are made and recorded.

The deep-frozen samples are analyzed and the captan content is determined. The method used to determine the presence of captan in the samples is described by Buettler and Hoermann (1991 ).

Fifty grams of homogenized material is extracted with acetone. After being filtrated the extract becomes diluted by addition of water and a saturated sodium chloride solution and shaken out with n-hexane. The n-hexane extract is washed with water and evaporated to dryness. The residue is purified by column chromatography over silica gel. Captan is determined by HPLC using UV detection.

Results

Table 1 show the decline in captan content of samples taken over time. The values shown correspond to the day the sample was taken.

The residue analysis shows a rapid decrease in the captan content over time. The captan content decreases from 51.3 mg/kg to less than 0.02 mg/kg, or over 2,500 fold, during the compostation process. The sample taken on day 1 has 51.3 mg/kg captan and 48 hours later the captan content has decreased to 20.3 mg/kg, a decrease of 60%. On day 8, the captan content has decreased to less that 1 mg/kg, and reaches the detection level limit of 0.02 mg/kg after 65 days Captan used as a seed treatment for seed corn is usually applied at a rate of 150 g a.i. per 100 kg seed. Actual dosages applied to seed can vary significantly from the target dosage because the applied amount is determined subjectively, usually based on visual impression. At this application rate, one would expect an initial captan content of 1,500 mg per kg seed, or about 500 mg/kg compost to which 3 parts of tree bark had been added.

Significant variations of a.i. content on seed due to inaccuracies during treatment, subsequent mechanical abrasion in handling and shipping the seed used in the trial, and some losses as dust from the grinding process, can all plausibly be expected to have played a role in decreasing the captan content 10 fold from the expected.

Since the captan contend was determined by residue analysis to have decreased 2,500 fold, it can reasonably be assumed that the captan content would also be decreased if its initial content is 10 times higher.

From the above results it can be concluded that obsolete treated seed can be used to make compost. If the original material used is homogenous, free of noxious weed seeds and free of any other elements that effect quality of compost negatively, the issuing compost should be of comparatively high value and could be commercialized.

It can be concluded that compostation is expected to be a safe, economical and environmentally sound method of disposing of obsolete treated seed.

EXAMPLE 2

Compostation of Captan Treated Seed Corn

Ingredients 1.300 l of seed corn treated with captan at a rate of 200 gr a.i. per 100 kg seed
3.250 l of shredded tree bark [about 5–15 mm in width and about 35 mm in length]
540 l of ripe compost
100 l soil
420 l water
15 kg urea
28 kg zeolites

Compostation Process

This trial is carried out in a heap with the kernels not ground but left whole. The above ingredients are mixed mechanically and a heap of about 200 cm in width, about 400 cm in length and 90 cm in height is created. Water is added when needed to keep the content of the heap moist.

The monitoring of the compostation process and the sampling is performed as described previously in example 1.

Residue Analysis

Residue analysis is essentially performed as described in example 1. Instead of 50 g only 5 g of homogenized material is extracted with acetone this time. The resulting extract is shaken out with petrol ether and the residue further purified by column chromatographie using a Florisil column [Fluka AG, 9470 Buchs, Switzerland, #46392].

Results

The results provided in table 2 show that the captan content in the compost decreases from 212 mg/kg to <0.05 mg/kg within 21 days. The results in table 2 are adjusted to the recovery rates obtained, which are as follows:

recovery rate:
0.1 mg/kg: 55, 70, 67%
1.0 mg/kg: 53, 70. 69%

EXAMPLE 3

Compostation of Pirimiphos-Methyl Treated Seed Corn

Ingredients 90 l of seed corn treated with pirimiphos-methyl at a rate of about 0.8 gr a.i. per 100 kg seed
270 l of shredded tree bark [about 5–15 mm in width and about 35 mm in length]
40 l of ripe compost
36 l water
6 l soil
3 l zeolithes
1.2 kg urea

Compostation Process

This trial is carried out in a drum as described in example 1. As in example 2, the kernels are not ground but left whole.

The monitoring of the compostation process and the sampling is performed as described previously in example 1.

Residue Analysis 10 g of homogenized material is shaken out with 70 ml of a methanol/water [8 Vol+2 Vol] mixture. After being filtrated the extract is diluted up to a volume of 100 ml using the same methanol/water mixture as a diluent.

Aliquots of 5 ml are diluted with 10 ml HPLC water and 5 ml of a saturated sodium chloride solution and extracted twice with 5 ml methylene chloride each. The methylene chlorid phases are pooled and evaporated to dryness at 40° C. The residue is solved in 2 ml hexane and further purified by gas chromatography using a phosphor-nitrogen detector.

Results

The results provided in table 3 show that the pirimiphos-methy content in the compost decreases from 0.41 mg/kg to <0.02 mg/kg within 70 days.

EXAMPLE 4

Compostation of TMTD Treated Seed Corn

Ingredients 80 l of seed corn treated with TMTD at a rate of 150–200 gr a.i./100 kg seed
240 l of shredded tree bark [about 5–15 mm in width and about 35 mm in length]
22 l of ripe compost
36 l water
3 l soil
3 l zeolithes
1.2 kg urea

Compostation Process

This trial is carried out in a drum as described in example 1. As in example 2, the kernels are not ground but left whole.

The monitoring of the compostation process and the sampling is performed as described previously in example 1.

Residue Analysis

The samples are thoroughly homogenized and acidyfied. The $CS_2$ set free is washed with caustic soda solution and transferred to a color reagent. The final determination is carried out by UV spectrometrie at 435 nm.

The extinction is correlated to the TMTD residues by linear regression based on a five-parameter standard curve

Results

The results provided in table 4 show that the TMTD content in the compost decreases from 146.66 mg/kg to <0.01 mg/kg within 100 days.

TABLES

TABLE 1

| Development of captan content during compostation process | |
|---|---|
| days after treatment | concentration [mg/kg] |
| 1 | 51.3 |
| 2 | 35.0 |
| 3 | 20.3 |
| 4 | 8.4 |
| 5 | 3.58 |
| 8 | 0.300 |
| 9 | 0.166 |
| 10 | 0.119 |
| 11 | 0.216 |
| 12 | 0.0940 |
| 17 | 0.0417 |
| 24 | <0.0250 |
| 31 | <0.0250 |
| 38 | <0.0250 |
| 45 | <0.0250 |
| 52 | 0.0250 |
| 59 | 0.0200 |
| 66 | 0.0200 |
| 73 | 0.0217 |
| 80 | 0.0200 |
| 87 | 0.0200 |
| 94 | 0.0200 |
| 101 | 0.0200 |
| 108 | 0.0200 |
| 115 | <0.0200 |
| 122 | <0.0200 |

TABLE 2

| Development of captan content during compostation process | |
|---|---|
| days after treatment | concentration [mg/kg] |
| 0 | 212 |
| 1 | 180 |
| 2 | 206 |
| 3 | 74.3 |
| 4 | 53.60 |
| 7 | 5.57 |
| 8 | 1.71 |
| 9 | 0.94 |
| 10 | 6.43 |
| 11 | 2.06 |
| 14 | 0.05 |
| 21 | <0.05 |
| 27 | 0.07 |
| 57 | <0.05 |

TABLE 2-continued

Development of captan content during compostation process

| days after treatment | concentration [mg/kg] |
|---|---|
| 84 | <0.05 |
| 105 | <0.05 |

TABLE 3

Development of primiphos-methyl content during compostation process

| days after treatment | concentration [mg/kg] |
|---|---|
| 1 | 0.41 |
| 2 | 0.38 |
| 3 | 0.24 |
| 7 | 0.30 |
| 8 | 0.24 |
| 9 | 0.22 |
| 10 | 0.17 |
| 11 | 0.13 |
| 14 | 0.08 |
| 15 | 0.07 |
| 16 | 0.09 |
| 23 | 0.08 |
| 30 | 0.05 |
| 37 | 0.04 |
| 44 | 0.05 |
| 51 | 0.03 |
| 58 | 0.03 |
| 65 | 0.02 |
| 72 | <0.02 |
| 79 | <0.02 |
| 86 | <0.02 |
| 93 | <0.02 |
| 100 | <0.02 |
| 107 | <0.02 |

TABLE 4

Development of TMTD content during compostation process

| days after treatment | concentration [mg/kg] |
|---|---|
| 1 | 146.66 |
| 2 | 145.15 |
| 3 | 145.06 |
| 7 | 139.38 |
| 8 | 12.53 |
| 9 | 12.62 |
| 10 | 8.48 |
| 11 | 3.26 |
| 14 | 0.79 |
| 15 | 0.74 |
| 16 | 3.80 |
| 23 | 0.30 |
| 30 | 0.36 |
| 37 | 0.35 |
| 44 | 0.03 |
| 51 | 0.06 |
| 58 | 0.03 |
| 65 | 0.02 |
| 72 | 0.02 |
| 79 | n.n. |
| 86 | 0.01 |
| 93 | n.n. |
| 100 | n.n. |
| 107 | 0.04 |

BIBLIOGRAPHY

Buettler and Hoermann, Deutsche Forschungsgemeinschaft, Methode S 20, VCH Weinheim (1991)

Buyanovsky et al, Bulletin of Environmental Contamination and Toxicology, 40(5): 689–695 (1988)

Coats and Dahm, Abstract of Papers of the American Chemical Society, 1979, Sep., p. 82, (1979)

Kibler (1973), PhD Thesis; University of Hohenheim (1979)

Schoen and Winterlin, Abstracts of Papers, 189th ACS National Meeting (1985)

Spohn E, "Selber kompostieren für Garten und Feld, Schnitzer-Verlag, 1978

WO 92/03393 [YAMASHITA]

What is claimed is:

1. A process for disposing of obsolete planting seed treated with seed-protectant coatings selected from the group consisting of captan, pirimiphos-methyl and thiram wherein said process comprises subjecting said seed having an initial level of protectant coatings to a compostation under conditions that ensure sufficient aeration and moisture content and a suitable C:N ratio that is optimal for the development and activity of the microorganisms involved in the compostation process wherein the initial level of said seed-protectant coatings is reduced by 20% within the first two weeks or said compostation process.

2. A process according to claim 1, wherein the moisture content is in a range of form 20% to 80%.

3. A process according to claim 1, wherein the C:N ratio is in a range of from 30:1 to 45:1.

4. A process according to claim 1 comprising
   (a) intermixing the obsolete treated plant seed together with an additional source of energy, that can be suitably used by the microorganisms involved in the compostation process and that guarantees a balanced C/N ratio of the raw materials that is optimal for the development and activity of the microorganisms involved, using one of the customarily used compostation equipment;
   (b) optionally adding a neutral inorganic carrier comprising a large surface area in relation to its diameter to support the development and spread of the microorganisms in the organic material and/or any other supplemental material that is capable of positively influencing microbial decomposing activity;
   (c) ensuring a sufficient aeration and moisture content; and
   (d) initiating the compostation process by adding a suitable amount of water.

5. A process according to claim 4 characterized in that it is performed in heaps.

6. A process according to claim 4 characterized in that it is performed in a drum composter.

7. A process according to claim 4, wherein the C:N ratio is in a range of from 30:1 to 45:1.

8. A process according to claim 7, wherein the C:N ratio is in a range of 40:1.

9. A process according to claim 4, wherein the moisture content is in a range of form 20% to 80%.

10. A process according to claim 9, wherein the moisture content is in a range of form 50% to 60%.

11. A process according to claim 4, wherein the neutral, water-insoluble, inorganic carrier comprises material selected from the group consisting of charcoal, sand, larval rock, or hydrous silicates.

12. A process according to claim 11, wherein the neutral, water-insoluble, inorganic carrier comprises zeolites.

13. A process according to claim 4, wherein the supplemental material comprises agents for adjusting the nutrient or mineral content or the pH of the raw material.

14. A process according to claim 13, wherein the supplemental material comprises agents selected from the group consisting of raw ammonium salts, nitrates, raw phosphate and super-phosphate, agricultural limestone, finely ground stone meals, carbonate chalk and fertilizer grade ammonium sulphate.

15. A process according to claim 4, wherein the supplemental material comprises a starting material for restarting the compostation process.

16. A process according to claim 15, wherein the restarting material is ripe compost.

17. A process according to claim 4, wherein a carbon source with a fair degree of lignification is used as an additional source of energy.

18. A process according to claim 17, wherein tree bark is used as an additional source of energy.

19. A process for disposing of containers for seed wherein said containers are composed of organic matter and contaminated with seed-protectant coatings selected from the group consisting of captan, pirimiphos-methyl and thiram wherein said process comprises subjecting said containers having an initial level of protectant coatings to a compostation under conditions that ensure sufficient aeration and moisture content and a suitable C:N ratio that is optimal for the development and activity of the microorganisms involved in the compostation process wherein the initial level of said seed-protectant coatings is reduced by 20% within the first two weeks or said compostation process.

20. A process for disposing of obsolete planting seed treated with seed-protectant coatings selected from the group consisting of captan, pirimiphos-methyl and thiram and seed containers composed of organic matter and contaminated with seed-protectant coatings selected from the group consisting of captan, pirimiphos-methyl and thiram wherein said process comprises subjecting said seed and containers having an initial level of protectant coatings to a compostation under conditions that ensure sufficient aeration and moisture content and a suitable C:N ratio that is optimal for the development and activity of the microorganisms involved in the compostation process wherein the initial level of said seed-protectant coatings is reduced by 20% within the first two weeks or said compostation process.

* * * * *